(12) United States Patent
Ganjoo et al.

(10) Patent No.: US 12,077,468 B2
(45) Date of Patent: *Sep. 3, 2024

(54) COATED ARTICLE HAVING A PROTECTIVE COATING CONTAINING SILICON NITRIDE AND/OR SILICON OXYNITRIDE

(71) Applicant: Vitro Flat Glass LLC, Cheswick, PA (US)

(72) Inventors: Ashtosh Ganjoo, Allison Park, PA (US); Sudarshan Narayanan, Pittsburgh, PA (US); James J. Finley, Pittsburgh, PA (US); Paul A. Medwick, Allison Park, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,386

(22) Filed: Oct. 10, 2019

(65) Prior Publication Data

US 2020/0039875 A1 Feb. 6, 2020

Related U.S. Application Data

(63) Continuation of application No. 16/274,767, filed on Feb. 13, 2019, now Pat. No. 10,479,724.

(Continued)

(51) Int. Cl.
*B32B 15/04* (2006.01)
*B32B 17/06* (2006.01)
(Continued)

(52) U.S. Cl.
CPC ........ *C03C 17/3626* (2013.01); *C03C 17/256* (2013.01); *C03C 17/3435* (2013.01); *C03C 17/36* (2013.01); *C03C 17/3639* (2013.01);
*C03C 17/3644* (2013.01); *C03C 17/3649* (2013.01); *C03C 17/3652* (2013.01); *C03C 17/3668* (2013.01); *C03C 17/3681* (2013.01); *C23C 28/04* (2013.01); *C23C 28/042* (2013.01); *C23C 28/048* (2013.01); *C23C 28/32* (2013.01);
(Continued)

(58) Field of Classification Search
CPC . C23C 28/36; C03C 17/3626; C03C 17/3681; C03C 17/366
USPC ........ 428/426, 428, 432, 434, 688, 701, 702
See application file for complete search history.

(56) References Cited

U.S. PATENT DOCUMENTS 4,193,236 A 3/1980 Mazzoni et al.
4,336,120 A 6/1982 Sakakura et al.
(Continued)

FOREIGN PATENT DOCUMENTS

CA 2156571 C 12/2000
CN 101875536 A 11/2010
(Continued)

*Primary Examiner* — Lauren R Colgan
(74) *Attorney, Agent, or Firm* — The Webb Law Firm

(57) ABSTRACT

A coated article includes a substrate, a functional layer over at least a portion of the substrate, and a protective coating over at least a portion of the functional layer, wherein an uppermost layer of the functional layer is a metal oxide layer, and wherein the protective coating comprises a metal nitride layer and a metal oxynitride layer that is disposed between and in contact with at least part of the metal nitride layer and the metal oxide layer of the functional layer.

19 Claims, 5 Drawing Sheets

Related U.S. Application Data

(60) Provisional application No. 62/631,283, filed on Feb. 15, 2018, provisional application No. 62/734,656, filed on Sep. 21, 2018.

(51) Int. Cl.
   *C03C 17/25* (2006.01)
   *C03C 17/34* (2006.01)
   *C03C 17/36* (2006.01)
   *C23C 28/00* (2006.01)
   *C23C 28/04* (2006.01)

(52) U.S. Cl.
   CPC .......... *C23C 28/322* (2013.01); *C23C 28/34* (2013.01); *C23C 28/345* (2013.01); *C23C 28/3455* (2013.01); *C23C 28/36* (2013.01); *C03C 2217/212* (2013.01); *C03C 2217/216* (2013.01); *C03C 2217/228* (2013.01); *C03C 2217/256* (2013.01); *C03C 2217/258* (2013.01); *C03C 2217/281* (2013.01); *C03C 2217/70* (2013.01); *C03C 2217/944* (2013.01)

(56) References Cited

U.S. PATENT DOCUMENTS

| | | | |
|---|---|---|---|
| 4,379,040 A | 4/1983 | Gillery | |
| 4,464,874 A | 8/1984 | Shea, Jr. et al. | |
| 4,466,562 A | 8/1984 | DeTorre | |
| 4,671,155 A | 6/1987 | Goldinger | |
| 4,716,086 A | 12/1987 | Gillery et al. | |
| 4,746,347 A | 5/1988 | Sensi | |
| 4,786,563 A | 11/1988 | Gillery et al. | |
| 4,792,536 A | 12/1988 | Pecoraro et al. | |
| 4,861,669 A | 8/1989 | Gillery | |
| 4,898,789 A | 2/1990 | Finley | |
| 4,898,790 A | 2/1990 | Finley | |
| 4,900,633 A | 2/1990 | Gillery | |
| 4,920,006 A | 4/1990 | Gillery | |
| 4,938,857 A | 7/1990 | Gillery | |
| 5,030,593 A | 7/1991 | Heithoff | |
| 5,030,594 A | 7/1991 | Heithoff | |
| 5,088,258 A | 2/1992 | Schield et al. | |
| 5,106,663 A | 4/1992 | Box | |
| 5,240,886 A | 8/1993 | Gulotta et al. | |
| 5,328,768 A | 7/1994 | Goodwin | |
| 5,344,718 A | 9/1994 | Hartig et al. | |
| 5,376,455 A | 12/1994 | Hartig et al. | |
| 5,385,872 A | 1/1995 | Gulotta et al. | |
| 5,393,593 A | 2/1995 | Gulotta et al. | |
| 5,425,861 A | 6/1995 | Hartig et al. | |
| 5,492,750 A | 2/1996 | Shumaker, Jr. et al. | |
| 5,532,180 A | 7/1996 | den Boer et al. | |
| 5,584,902 A | 12/1996 | Hartig et al. | |
| 5,709,930 A | 1/1998 | DePauw | |
| 5,821,001 A * | 10/1998 | Arbab ............ C03C 17/36 428/623 |
| 5,834,103 A | 11/1998 | Bond et al. | |
| 6,398,925 B1 | 6/2002 | Arbab et al. | |
| 6,458,673 B1 | 10/2002 | Cheung | |
| 6,495,251 B1* | 12/2002 | Arbab ............ C03C 17/3435 428/336 |
| 6,576,349 B2* | 6/2003 | Lingle ............ B32B 17/10009 428/426 |
| 6,586,102 B1* | 7/2003 | Stachowiak ............ C03C 17/36 428/426 |
| 6,589,658 B1* | 7/2003 | Stachowiak ............ C03C 17/36 428/426 |
| 7,087,309 B2* | 8/2006 | Kriltz ............ C03C 17/3681 428/432 |
| 7,267,879 B2* | 9/2007 | Thomsen ............ C03C 17/36 428/428 |
| 7,335,421 B2* | 2/2008 | Thiel ............ B32B 17/10036 428/428 |
| 7,585,396 B2* | 9/2009 | Veerasamy ............ B32B 17/10036 204/192.16 |
| 7,659,002 B2 | 2/2010 | Coster et al. | |
| 8,003,235 B2 | 8/2011 | Gagliardi et al. | |
| 8,409,716 B2* | 4/2013 | Schultz ............ C03C 17/225 428/336 |
| 8,420,162 B2 | 4/2013 | Blacker et al. | |
| 8,663,433 B2 | 3/2014 | Chonlamaitri et al. | |
| 9,703,011 B2* | 7/2017 | Adib ............ G02B 1/105 |
| 10,253,560 B2 | 4/2019 | Ding et al. | |
| 10,287,209 B2 | 5/2019 | Pallotta et al. | |
| 10,345,499 B2 | 7/2019 | Medwick et al. | |
| 2001/0041252 A1* | 11/2001 | Laird ............ C03C 17/36 428/216 |
| 2004/0058169 A1 | 3/2004 | Wang et al. | |
| 2005/0258030 A1* | 11/2005 | Finley ............ C23C 14/3414 204/192.26 |
| 2006/0121290 A1* | 6/2006 | Chonlamaitri ............ C03C 17/3626 428/428 |
| 2006/0240266 A1* | 10/2006 | Schicht ............ C03C 17/3435 428/426 |
| 2007/0082168 A1 | 4/2007 | Hartig | |
| 2008/0014448 A1 | 1/2008 | Lu et al. | |
| 2008/0187692 A1* | 8/2008 | Roquiny ............ C03C 17/36 428/34 |
| 2009/0142602 A1 | 6/2009 | Medwick et al. | |
| 2011/0236715 A1* | 9/2011 | Polcyn ............ C03C 17/36 428/209 |
| 2014/0272453 A1 | 9/2014 | Polcyn et al. | |
| 2014/0272455 A1* | 9/2014 | Ding ............ C23C 14/083 428/632 |
| 2016/0298384 A1* | 10/2016 | You ............ C03C 17/3689 |
| 2017/0341977 A1 | 11/2017 | Polcyn et al. | |
| 2019/0043640 A1 | 2/2019 | Ganjoo et al. | |

FOREIGN PATENT DOCUMENTS

| | | |
|---|---|---|
| CN | 106164003 A | 11/2016 |
| CO | 2017007805 A2 | 10/2017 |
| DE | 102013108215 A1 | 2/2015 |
| EP | 1427679 B2 | 1/2018 |
| GB | 2293179 A | 3/1996 |
| WO | 9529883 A1 | 11/1995 |
| WO | 9858885 A1 | 12/1998 |
| WO | 0037384 A1 | 6/2000 |
| WO | 0076930 A1 | 12/2000 |
| WO | 2008157148 A1 | 12/2008 |

\* cited by examiner

COATED ARTICLE HAVING A PROTECTIVE COATING CONTAINING SILICON NITRIDE AND/OR SILICON OXYNITRIDE

CROSS REFERENCE TO RELATED APPLICATIONS

This application is a continuation of U.S. application Ser. No. 16/274,767, filed Feb. 13, 2019, which claims the benefit of U.S. Provisional Patent Application No. 62/631,283, filed Feb. 15, 2018 and U.S. Provisional Patent Application No. 62/734,656, filed on Sep. 21, 2018, each of which is incorporated herein by reference in its entirety.

BACKGROUND OF THE INVENTION

Field of the Invention

An invention according to the present disclosure relates generally to solar control coatings having a top coat including a metal nitride layer and/or a metal oxynitride disposed over a metal oxide layer.

Technical Considerations

Coating stacks of coated articles may corrode over time. To protect from this, protective coatings can be applied to coating stacks. For example, titanium dioxide films disclosed in U.S. Pat. Nos. 4,716,086 and 4,786,563 are protective films that provide chemical resistance to a coating. Silicon oxide disclosed in Canadian Patent Number 2,156,571, aluminum oxide and silicon nitride disclosed in U.S. Pat. Nos. 5,425,861; 5,344,718; 5,376,455; 5,584,902 and 5,532,180; and in PCT International Patent Publication No. 95/29883 are also protective films that provide chemical resistance to a coating. This technology could be advanced by more chemically and/or mechanically durable coatings.

An additional known problem with coating stacks including protective coatings occurs in silver-based coating stacks. In certain coated articles, a top layer of a functional coating includes a metal oxide layer, such as a layer of zinc oxide, is positioned over a terminal metal-primer layer of the functional coating. This may cause corrosion or glitter defects in the stack upon extended exposure to a condensing-humidity environment. Thus, a further need exists to reduce or avoid these defects in a coating stack.

SUMMARY OF THE DISCLOSURE

According to one aspect of the invention, a coated article is provided. The coated article comprises a substrate, a first functional layer over at least a portion of the substrate, and a protective coating over at least a portion of the functional layer, wherein an uppermost layer of the functional layer is a metal oxide film, and wherein the protective coating comprises one or more layers of a metal nitride, a metal oxynitride, or a combination thereof.

In one aspect, the coated article comprises: a glass substrate; a first layer of zinc stannate over at least a portion of the glass substrate; a layer of zinc oxide over at least a portion of the layer of zinc stannate; a layer of silver over at least a portion of the layer of zinc oxide; a primer layer comprising Ti, TiAl and/or oxides thereof over at least a portion of the layer of silver; a second layer of zinc stannate over at least a portion of the primer layer; a metal oxynitride layer comprising silicon oxynitride directly over at least a portion of the second layer of zinc stannate; a metal nitride layer comprising silicon directly over at least a portion of the metal oxynitride layer; and a second protective layer comprising Ti, TiAl, and/or oxides of either of the preceding over at least a portion of the metal nitride layer.

In another aspect, a coated article is provided. The coated article comprises a substrate, a functional layer, having an uppermost layer, over at least a portion of the substrate, and a protective coating over at least a portion of the functional layer, wherein the uppermost layer of the functional layer is a dielectric layer having an index of refraction of at least 1.5, and not more than 2.1.

In another aspect, a coated article is provided comprising a substrate, a functional layer over at least a portion of the substrate, and a protective coating over at least a portion of the functional layer, wherein the functional layer comprises at least one metallic layer and a primer layer disposed at least partially over and in contact with at least part of the at least one metallic layer, and wherein an uppermost layer of the functional layer is disposed over and in contact with at least part of the primer layer, and the uppermost layer of the functional layer does not include zinc oxide.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1A:
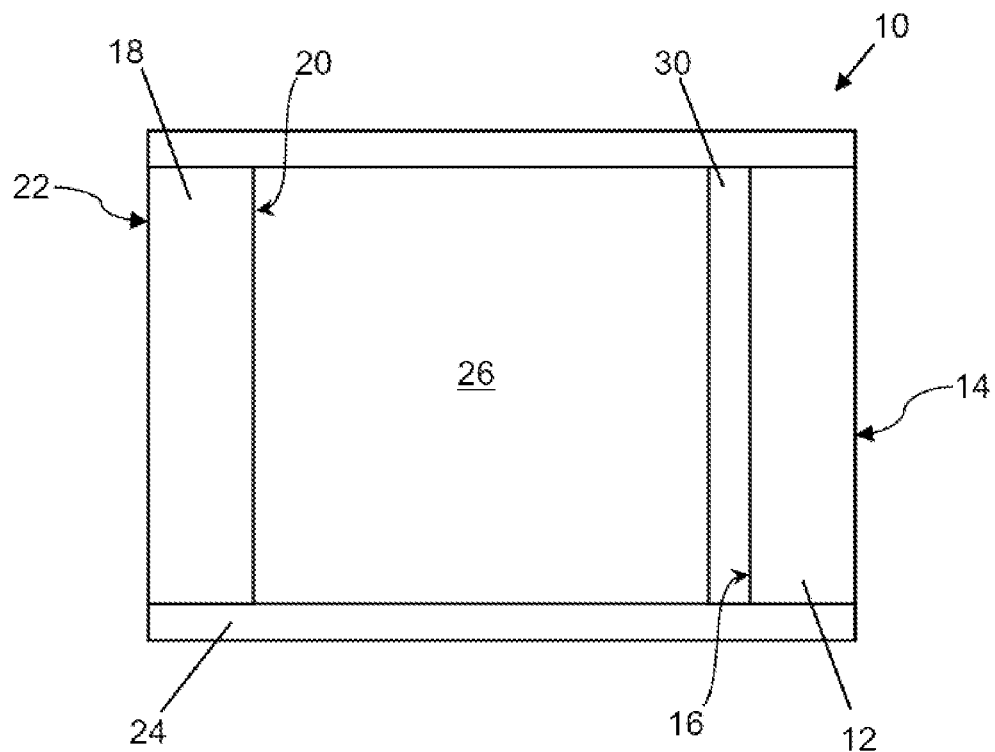
FIG. 1A is a side view (not to scale) of an insulating glass unit ("IGU") having a coating of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side. The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands.

For purposes of the following discussion, the coated articles described herein may be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the coated articles described herein are not limited to use with such architectural transparencies but could be practiced with transparencies in any desired field, such as, but not limited to, laminated or non-laminated residential and/or commercial windows, insulating glass units, and/or transparencies for land, air, space, above water and underwater vehicles. In one aspect or embodiment, the coated articles as described herein are transparencies for use in a vehicle, such as a window or a sunroof. Therefore, it is to be understood that the specifically disclosed exemplary aspects or embodiments are presented simply to explain the general concepts of the invention, and that the invention is not limited to these specific exemplary embodiments. Additionally, while a typical "transparency" can have sufficient visible light transmission such that materials can be viewed through the transparency, the "transparency" need not be transparent to visible light but may be translucent or opaque. That is, by "transparent" is meant having visible light transmission of greater than 0% up to 100%.

A non-limiting transparency 10 incorporating features of the invention is illustrated in FIG. 1A. The transparency 10 can have any desired visible light, infrared radiation, or ultraviolet radiation transmission and/or reflection.

The exemplary transparency 10 of FIG. 1A is in the form of a conventional insulating glass unit and includes a first ply 12 with a first major surface 14 (No. 1 surface) and an opposed second major surface 16 (No. 2 surface). In the illustrated non-limiting embodiment, the first major surface 14 faces the building exterior, i.e., is an outer major surface, and the second major surface 16 faces the interior of the building. The transparency 10 also includes a second ply 18 having an inner (first) major surface 20 (No. 3 surface) and an outer (second) major surface 22 (No. 4 surface) and spaced from the first ply 12. This numbering of the ply surfaces is in keeping with conventional practice in the fenestration art. The first and second plies 12, 18 can be connected in any suitable manner, such as by being adhesively bonded to a conventional spacer frame 24. A gap or chamber 26 is formed between the two plies 12, 18. The chamber 26 can be filled with a selected atmosphere, such as air, or a non-reactive gas such as argon or krypton gas. A solar control coating 30 (or any of the other coatings described below) is formed over at least a portion of one of the plies 12, 18, such as, but not limited to, over at least a portion of the No. 2 surface 16 or at least a portion of the No. 3 surface 20. Although, the coating could also be on the No. 1 surface or the No. 4 surface, if desired. Examples of insulating glass units are found, for example, in U.S. Pat. Nos. 4,193,236; 4,464,874; 5,088,258; and 5,106,663.

Figure 1B:
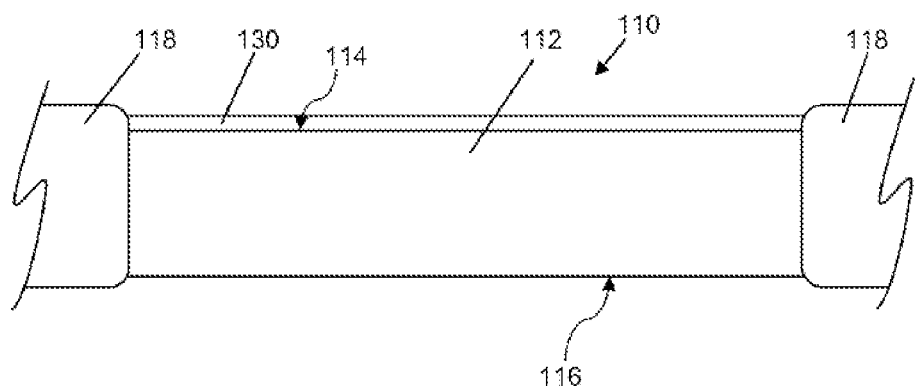
FIG. 1B is a sectional view of a transparency having a coating of the invention.

The exemplary transparency of FIG. 1B is in the form of a conventional transparency 110 for a vehicle, such as a window or sunroof. For clarity, seals, connectors, and opening mechanisms are not shown, nor is the complete vehicle. The transparency includes a first ply 112 with a first major surface 114 (No. 1 surface) and an opposed second major surface 116 (No. 2 surface) mounted in the body of a vehicle 118 (shown in part). In the illustrated non-limiting embodiment, the first major surface 114 faces the vehicle's exterior, and thus is an outer major surface, and the second major surface 116 faces the interior of the vehicle. Non-limiting examples of a vehicle body include: an automobile roof in the case of a sunroof, an automobile door or frame in the case of an automobile window, or a fuselage of an airplane. The transparency may be affixed to a mechanism by which the transparency, such as a car window or sunroof, can be opened and closes, as is broadly known in the vehicular arts. A solar control coating 130, or any of the other coatings described herein, is shown as formed over the No. 1 surface 114, it may be formed over at least a portion of the No. 2 surface 116.

In the broad practice of the invention, the plies 12, 18, 112 of the transparency 10, 110 can be of the same or different materials. The plies 12, 18, 112 can include any desired material having any desired characteristics. For example, one or more of the plies 12, 18, 112 can be transparent or translucent to visible light. By "transparent" is meant having visible light transmission of greater than 0% up to 100%. Alternatively, one or more of the plies 12, 18, 112, can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18, 112 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The plies 12, 18, 112 can each comprise, for example, clear float glass or can be tinted or colored glass or one ply 12, 18 can be clear glass and the other ply 12, 18, colored glass. Although not limiting, examples of glass suitable for the first ply 12 and/or second ply 18 are described in U.S. Pat. Nos. 4,746,347; 4,792,536; 5,030,593; 5,030,594; 5,240,886; 5,385,872; and 5,393,593. The plies 12, 18, 112 can be of any desired dimensions, e.g., length, width, shape, or thickness. In one exemplary automotive transparency, the first and second plies can each be 1 mm to 10 mm thick, such as 1 mm to 8 mm thick, such as 2 mm to 8 mm, such as 3 mm to 7 mm, such as 5 mm to 7 mm, such as 6 mm thick.

In non-limiting embodiments of the coated articles described herein, the solar control coating 30, 130 of the invention is deposited over at least a portion of at least one major surface of one of the glass plies 12, 18, 112. In the example according to FIG. 1A, the coating 30 is formed over at least a portion of the inner surface 16 of the outboard glass ply 12, 112; additionally or alternatively, it is to be understood that in non-limiting examples consistent with the present disclosure a coating may be formed over at least a portion of the inner surface 20 of the inboard glass ply 18. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The solar control coating 30 can block, absorb, or filter selected portions of the solar spectrum, such as, but not limited to, the IR, UV, and/or visible spectrums.

The coatings described herein, such as the solar control coatings 30, 130, can be deposited by any useful method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the coating 30, 130 is deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

FIG. 2 shows schematically an example of a coated article 200 according to the present disclosure. The coated article comprises a substrate 210. Substrate 210 may include any desired properties, and be of any desired thickness. The substrate 210 may comprise any suitable transparent material or materials, such as, for example and without limitation, the polymers, glass, and/or ceramic substrates described above in the context of plies 12, 18, and 112. In non-limiting examples, substrate 210 may comprise a glass substrates as described above in reference to plies 12, 18, 112, as shown in FIG. 1A or 1B. However, it is to be understood that the present invention may be applied to other substrates as well, such as those used in solar cells.

Functional layer 220 is disposed over at least a portion of substrate 210. As used in FIGS. 2-6, functional layer 220, 320, 420, 520 can be any functional coating. For example, it can include one or more dielectric films and/or one or more metal films. Alternatively, the functional layer 220, 320, 420, 520 may include a transparent conductive oxide (TCO), for example and without limitation, as disclosed in U.S. patent application Ser. No. 15/669,414. The functional layer 220, 320, 420, 520 can include the stack as described in any of U.S. Patent Application Publication Nos. 2017/0341977, 2014/0272453, 2011/0236715, and/or U.S. patent application Ser. No. 15/669,414, or any portion thereof. These exemplary stacks of the functional layer, except as specifically discussed below, are schematically represented at element 330, 430, 530 of FIGS. 3-6, with details of aspects of stacks 330 and 530 being depicted in, and described in reference to, FIGS. 3 and 6, respectively.

The functional layer may include one or more metallic layers. One or more metallic films within the functional layer 220, 320, 420, 520 may be comprised of silver, gold, palladium, copper, and/or a mixture of any of the preceding. Any metallic layer in the functional layer 220, 320, 420, 520 may be continuous or discontinuous.

The one or more metallic layers can be a continuous layer. Continuous metallic layers have a thickness in the range of 50 Å to 200 Å, preferably 55 Å to 150 Å, more preferably 55 Å to 100 Å, most preferably 60 to 80 Å.

Figure 3:
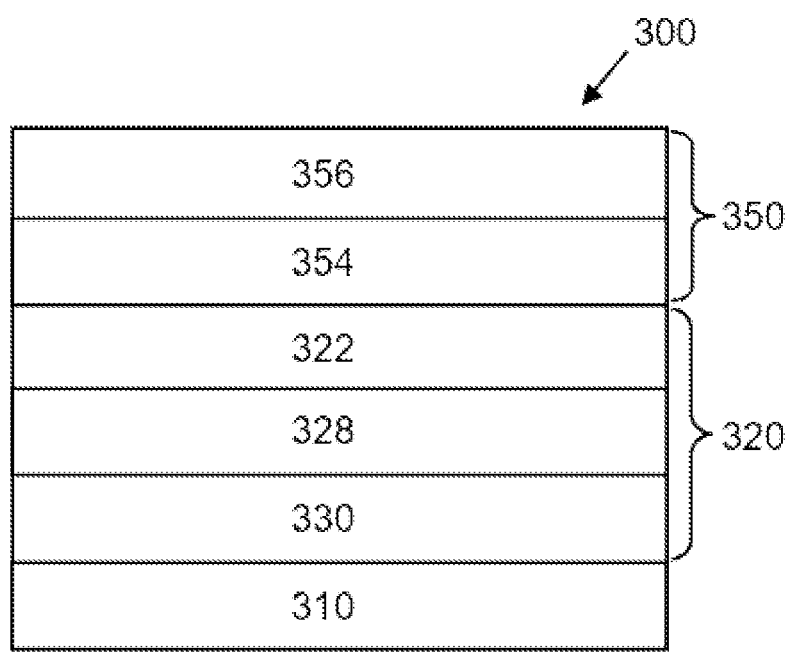
FIG. 3 is a sectional view (not to scale) of a coating according to an example of the invention.
Figure 4A:
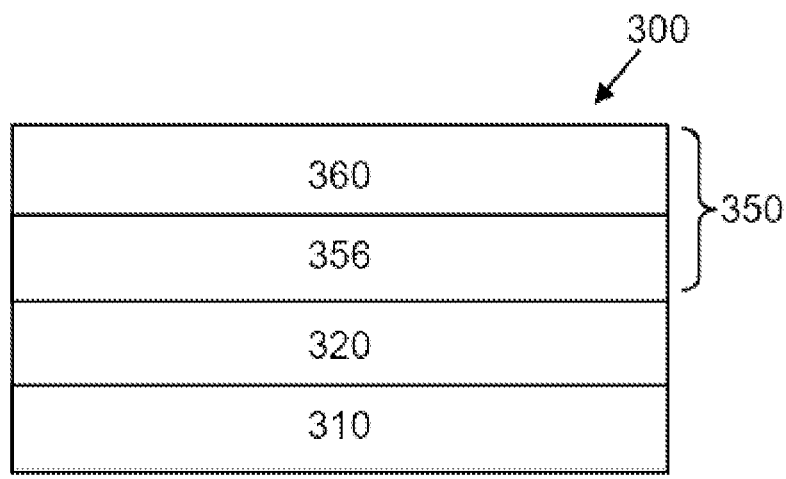
FIGS. 4A and 4B are sectional views (not to scale) of a coating according to an example of the invention.
Figure 4B:
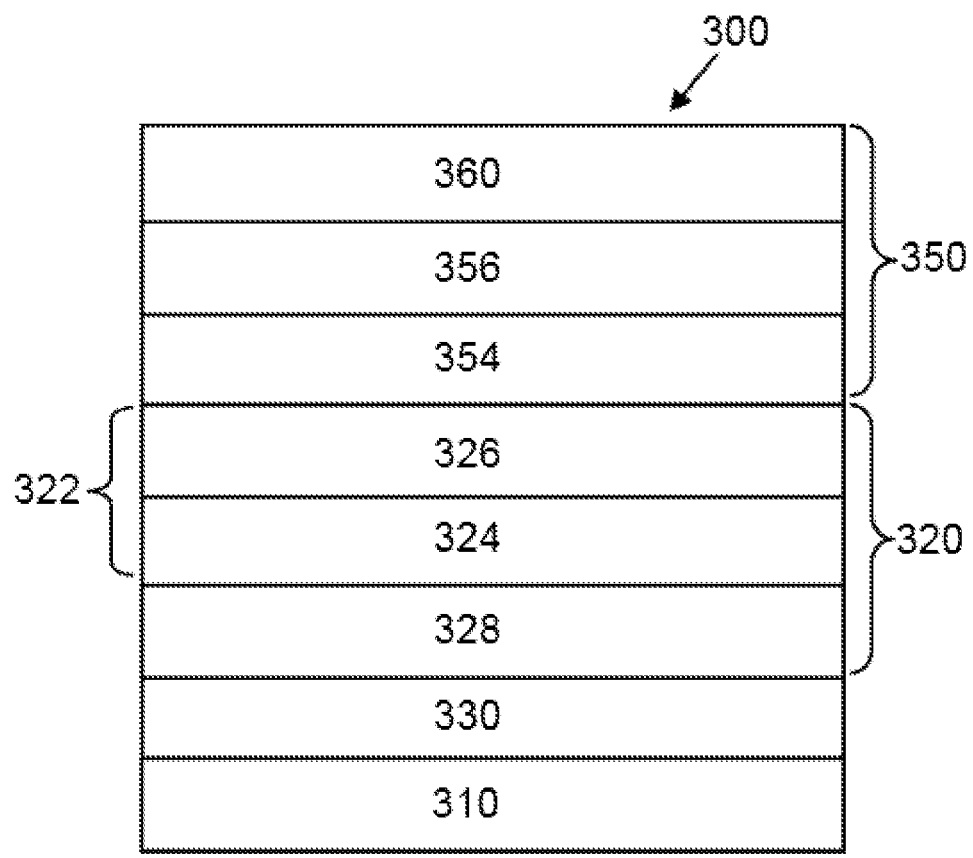

FIGS. 3, 4A, and 4B depict examples wherein the uppermost layer of the functional layer 320 comprises a dielectric layer, referred to as uppermost dielectric layer 322 as the uppermost film in the function layer 320. Examples of the uppermost dielectric layer 322 of the functional layer 320 can have a thickness in the range of 50 Å to 750 Å, preferably 250 Å to 600 Å, more preferably such as 300 Å to 550 Å, and most preferably 330 Å to 500 Å.

As shown in FIG. 4B, the uppermost dielectric layer 322 may include a first film 324 shown over the optional primer layer 328, and a second film 326 over the first film and in contact with a protective coating 350. The first film 324 and the second film 326 of the uppermost dielectric layer 322 can be a metal oxide, metal nitride or metal oxynitride film. The metal of the first film 324 and the second film 326 can be titanium, hafnium, zirconium, niobium, zinc, bismuth, lead, indium, tin, aluminum, silicon and mixtures thereof.

In one non-limiting embodiment, the first film 324 of the uppermost dielectric layer 322 can be a zinc/tin alloy oxide. By "zinc/tin alloy oxide" is meant both true alloys, and mixtures of the oxides. Zinc oxide can be deposited from a zinc cathode that includes other materials to improve the sputtering characteristics of the cathode. As such, the zinc/tin alloy oxide can be obtained from magnetron sputtering vacuum deposition from a cathode of zinc and tin. For example, the zinc cathode can include a small amount (e.g., up to 20 wt. %, up to 15 wt. %, up to 10 wt. %, or up to 5 wt. %) of tin to improve sputtering. In which case, the resultant zinc oxide film would include a small percentage of tin oxide, e.g., up to 10 wt. % tin oxide, e.g., up to 5 wt. % tin oxide. A coating layer deposited from a zinc cathode having up to 10 wt. % tin (added to enhance the conductivity of the cathode) is referred to herein as "a zinc oxide film"

even though a small amount of tin may be present. One non-limiting cathode can comprise zinc and tin in proportions of from 5 wt. % to 95 wt. % zinc and from 95 wt. % to 5 wt. % tin, such as from 10 wt. % to 90 wt. % zinc and from 90 wt. % to 10 wt. % tin. However, other ratios of zinc to tin could also be used.

One suitable metal alloy oxide that can be present in the first film 324 or the second film 226 is zinc stannate. By "zinc stannate" is meant a composition of $ZnxSn_{1-x}O_{2-x}$ (Formula 1) where "x" varies in the range of greater than 0 to less than 1. For instance, "x" can be greater than 0 and can be any fraction or decimal between greater than 0 to less than 1. For example, where x=⅔, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the layer.

FIG. 4A discloses one embodiment of the coated article and comprises a substrate 310, a functional layer 320 according to any aspect or embodiment described herein, and a protective coating 350, comprising a metal nitride film 356 over the functional layer 320, and a second protective film 360 over the metal nitride film 356. The functional layer comprises an uppermost dielectric layer, e.g., as shown in FIGS. 3 and 4B. In one non-limiting embodiment, the uppermost dielectric layer 322 may consist of a metal oxide, such as zinc stannate. In a further non-limiting embodiment, the uppermost dielectric layer 322 may have an index of refraction of not less than 1.5, and not more than 2.1. In a further non-limiting embodiment, the uppermost dielectric layer 322 may have an index of refraction of not less than 1.7, and not more than 1.9, and still more preferably not less than 1.8, and not more than 1.85.

As shown in FIG. 4B, in another non-limiting example comprising a substrate 310, and a functional layer 320 comprising an uppermost dielectric layer 322, an optional primer layer 328, and a stack 330, for example a stack as described in reference to FIG. 3, the uppermost dielectric layer 322 of the functional layer 320 may include a first film 324, comprised of, or consisting of, a metal oxide, such as zinc oxide, which is deposited over at least a portion of the optional primer layer 328. A second film 326 of the uppermost dielectric layer 322 of the functional layer 320, which is positioned over at least a portion of the first film 324, may comprise zinc stannate.

As shown in FIGS. 3-4B, the functional layer 320 also may include an optional primer layer 328 disposed under the dielectric layer 322. The optional primer layer 328 can be a single film or a multiple film layer. The optional primer layer 328 can include an oxygen-capturing material that can be sacrificial during the deposition process to prevent degradation or oxidation of the metallic layer 334 during the sputtering process or subsequent heating processes. The optional primer layer 328 can also absorb at least a portion of electromagnetic radiation, such as visible light, passing through the coating 300. Examples of materials useful for the optional primer layer 328 include titanium, silicon, silicon dioxide, silicon nitride, silicon oxynitride, nickel-chrome alloys (such as Inconel), zirconium, aluminum, alloys of silicon and aluminum, alloys containing cobalt and chromium (e.g., Stellite®), and mixtures of any of the preceding. In a non-limiting embodiment, the optional primer layer 328 may comprise titanium, or titanium and aluminum, which are deposited as a metal and at least a portion of the titanium, or titanium and aluminum are subsequently oxidized. The optional primer layer 328 can have a thickness in the range of from 5 Å to 50 Å, e.g., from 10 Å to 35 Å, e.g., from 15 Å to 35 Å, e.g. from 10 Å to 20 Å, e.g. from 10 Å to 30 Å, e.g., from 20 Å to 30 Å, e.g. from 30 Å to 40 Å. In another example, the optional primer layer 328 can have a thickness in the range of from 5 Å to 50 Å, e.g., from 10 Å to 25 Å, e.g., from 15 Å to 25 Å, e.g., from 15 Å to 22 Å; e.g. from 25 Å to 36 Å. As shown, the optional primer layer 328, when present, is disposed under and in direct contact with the first film 324 of the dielectric layer 322. While it is shown in the figures, it is to be understood that examples according to the invention do not necessarily include the optional primer layer 328.

Figure 2A:
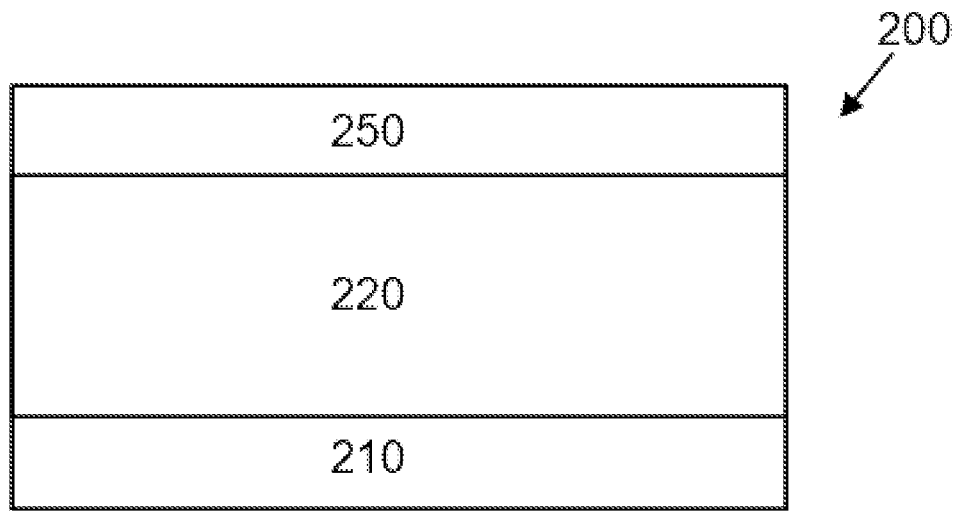
FIGS. 2A and 2B are sectional views (not to scale) of coatings of the invention.
Figure 2B:
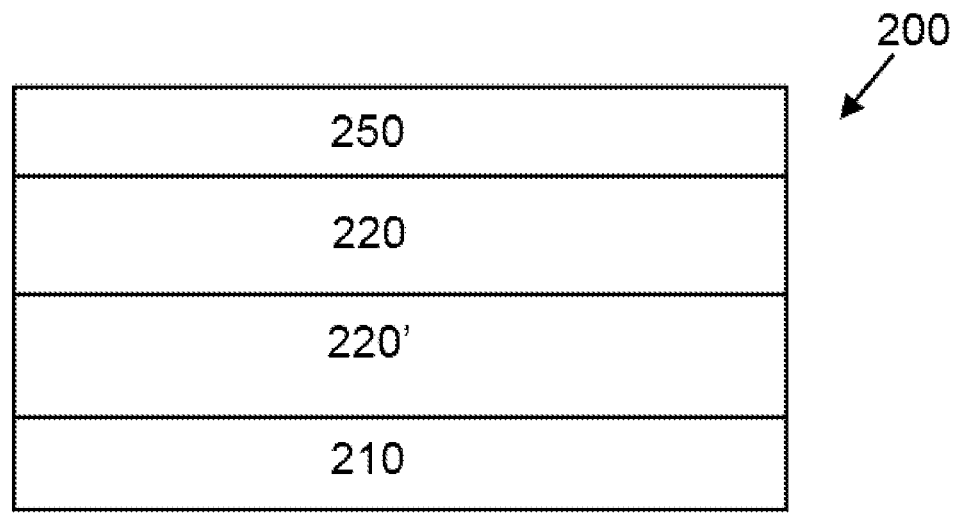

With reference to FIG. 2A, protective coating 250 is disposed over at least a portion of the functional layer 220 and is the uppermost layer of the coated article. Protective coating 250 can help protect the underlying coating layers, such as functional layer 220 and any of its component films and layers, from mechanical and/or chemical attack. FIG. 2B is similar in structure to the coated article depicted in FIG. 2A, showing a substrate 210 and a protective coating 250, but includes a first functional layer 220 that is the same as the functional layer 220 of FIG. 2A, and a second functional layer 220' disposed under the first functional layer 220 and over the substrate 210. The first functional layer 220 may be the same as, or different from the second functional layer 220'. For example, and without limitation, the first functional layer 220 comprises a dielectric layer, a metallic layer over the dielectric layer, and optionally, a primer layer over the metallic layer, and the uppermost dielectric layer comprises a metal oxide film over the metallic layer, and over the primer layer when the primer layer is present. The second functional layer 220' comprises a second dielectric layer over the substrate 210, a second metallic layer over the second dielectric layer, and optionally a second primer layer over the second metallic layer. In one example, one of the first and/or second metallic layer is subcritical. In another example neither is subcritical. In yet another example, the coated article comprises a third functional layer (not shown) that is under the second functional layer 220' and over the substrate 210, and which is the same as or different from any of the first or second functional layers 220, 220'. It is noted that multiple smaller functional layers may be layered to produce a larger functional layer that may or may not have properties that are unique to any particular combination of smaller functional layers, such as with single-silver, double-silver, and triple-silver coatings, optionally comprising one or more subcritical silver layers.

In one embodiment of the invention, referring to FIG. 4A, the protective layer 350 may comprise silicon oxide, silicon oxynitrides, silicon nitride, a mixture of any two of more of the preceding, and/or an alloy of any of the preceding, and which may provide increased durability to the functional layer 320. The protective layer 350 may include of silicon oxide, silicon oxynitrides, and/or silicon nitride deposited with other materials having superior electrical conductivity to improve sputtering of the silicon. For example, during deposition, the silicon cathode can include a small amount (e.g., up to 20 wt. %, up to 15 wt. %, up to 10 wt. %, or up to 5 wt. %) of aluminum to improve sputtering. In which case, the resultant protective layer would include a similar percentage of aluminum, e.g., up to 15 wt. % aluminum, e.g., up to 10 wt. % aluminum, e.g., up to 5 wt. % aluminum. A coating layer deposited from a silicon cathode having up to 10 wt. % aluminum added to enhance the conductivity of the cathode is referred to herein as "a silicon oxide", "a silicon oxynitride", or "a silicon nitride" layer or film, even though a small amount of aluminum may be present. The small amount of aluminum in the cathode (e.g., less than or equal to 15 wt. %, such as less than or equal to 10 wt. %, such as less than or equal to 5 wt. %) is believed to form aluminum nitride in the predominantly silicon nitride protective layer 350. In the case of a silicon nitride layer, the protective layer 350 may be formed in a nitrogen atmosphere; however, it is to be understood that other gasses, such as oxygen, may be present in the atmosphere during the deposition of the protective layer 350.

In another embodiment, referring to FIG. 4B, the protective coating 350 may be comprised of a film of a metal nitride 356, such silicon nitride, disposed over and in contact with a film of metal oxynitride 354, such as SiON, disposed over or and in contact with the uppermost dielectric layer 322 of the functional layer 320. Examples of metal oxynitride film 354 also, or alternatively, may include two or more metal nitrides and/or alloys of one or more metal nitrides. Examples of metal nitride film 356 also, or alternatively, may include mixtures of two or more metal oxynitrides and/or alloys of one or more metal oxynitride. The protective coating 350 may provide increased durability to the functional layer 320. The protective coating 350 may be deposited with other materials having superior electrical conductivity to improve sputtering of the metal.

The protective coating 250, 350 has a total thickness (i.e. the sum of all of the thickness of the layers or films within the protective coating 250, 350) in the range of 320 Å to 800 Å, 420 Å to 800 Å, 400 Å to 700 Å, 500 Å to 800 Å, 600 Å to 700 Å, 580 Å to 630 Å or 620 Å to 670 Å.

The atomic ratio of oxygen and nitrogen in metal oxynitrides can vary, from 0 wt. % to 100 wt. %, where wt. % refers to the ratio of the mass of N or O to the total mass of N+O in the composition, excluding the metal of the metal oxynitride. As such, in reference to FIG. 4B, the metal oxynitride film 354 comprises greater than 0 wt. % nitrogen, and not more than 100 wt. % nitrogen. The metal oxynitride film 354 comprises greater than 0 wt. % oxygen, and not more than 15 wt. % oxygen; not more than 10 wt. % oxygen; not more than 5 wt. % oxygen. Non-limiting examples of useful atomic ratios of oxygen and nitrogen in the metal oxynitride layer include, for example and without limitation: from 0.1% to 99.9% O with from 99.9% to 0.1% N; from 1% to 99% O with from 99% to 1% N; or from 10% to 90% O with from 90% to 10% N.

In one embodiment, the oxynitride is an oxynitride of the same metal as in the metal nitride layer 356 that contacts the metal oxynitride layer 354. In another embodiment, the metal oxynitride layer 354 is a gradient layer wherein the portion of the oxynitride layer that is closest to the uppermost dielectric layer 322 comprises a greater amount of oxygen, and the opposite portion of the metal oxynitride layer 354, e.g., that is closest to the metal nitride layer 356, comprises a greater amount of nitrogen, for example, in atomic ratios described above. In one embodiment, the metal oxynitride layer 354 and the metal nitride layer 356 form a continuous, single gradient layer. In another embodiment, the metal oxynitride layer 354 is applied over a metal oxide layer and/or in between a metal oxide layer and a metal nitride layer. In another embodiment, the metal nitride layer 356 is not present, and the metal oxynitride film 354 is a gradient layer, wherein amount of oxygen in the metal oxynitride film decreases with increased distance from the uppermost dielectric layer. For example, the portion of the oxynitride layer that is closest to the uppermost dielectric layer 322 comprises a greater amount of oxygen, and the opposite portion of the oxynitride layer 354, comprises a greater amount of nitrogen, for example, in atomic ratios described above, for example and without limitation: ranging from 0.1% to 99.9% O with from 99.9% to 0.1% N; from 1% to 99% O with from 99% to 1% N; or from 10% to 90% O with from 90% to 10% N.

In the protective coating 350 according to the present disclosure, the metal oxynitride film 354, such as a film comprised of silicon oxynitride, may have an index of refraction of at least 1.4, and not more than 2.3. In one embodiment, the metal oxynitride film 354 has an index of refraction of at least 1.45, and not more than 2.2. In another embodiment, the metal oxynitride film 354 has an index of refraction of at least 1.75, and not more than 2.1. In yet another embodiment, the metal oxynitride film 354 has an index of refraction of at least 1.8, and not more than 2.1. It is to be understood that the index of refraction of the metal oxynitride film 354 at least partially depends on the weight percentage of nitrogen present in the metal oxynitride film 354. The protective coating 350 may be the uppermost layer of the coated article.

The metal oxynitride film 354 can have a thickness in the range of from >0 Å to 400 Å, such as from 70 Å to 400 Å, from 100 Å to 400 Å, from 280 Å to 330 Å, or from 110 Å to 130 Å. In embodiments where the metal oxynitride film 354 is a gradient layer, is the only film in the protective coating, or where there is no metal nitride film in the protective coating, it may have a thickness of 200 Å to 400 Å, preferably 225 Å to 375 Å, more preferably 250 Å to 350 Å, most preferably 280 Å to 330 Å.

The metal nitride film 356 can have a thickness in the range of from >0 Å to 400 Å, such as from 70 Å to 400 Å, from 100 Å to 400 Å, from 250 Å 400 Å, from 280 Å to 330 Å, from 200 Å to 250 Å, from 200 Å to 400 Å, or from 100 Å to 150 Å. In embodiments where there is no metal oxynitride layer and/or no second protective film, the metal nitride film 356 can have a thickness in the range of 100 Å to 400 Å, preferably 250 Å to 400 Å, most preferably 280 Å to 330 Å. In embodiments where the protective coating has a metal oxynitride film 354 and a second protective layer, the metal nitride film 356 can have a thickness of 100 Å to 400 Å, preferably 150 Å to 330 Å, more preferably 175 Å to 300 Å, most preferably 200 Å to 250 Å. In embodiments where there protective coating has both a metal nitride 356 film and a second protective film 360, the metal oxynitride film can have a thickness of 50 Å to 200 Å, preferably 75 Å to 175 Å, more preferably 100 Å to 150 Å, most preferably 110 Å to 130 Å.

In certain embodiments, the invention has a combined thickness of the metal oxynitride film 354 (if present) and/or the metal nitride film 356 (if present). That combined thickness can be between 200 Å and 800 Å, for example, 320 Å to 800 Å, 320 Å to 370 Å, or 280 Å to 330 Å.

The combined layer of metal nitride, metal oxynitride, metal nitride, and/or second protective film, such as TiAlO, can have a thickness ranging from >0 Å to 1000 Å, such as from 170 Å to 800 Å, from 320 Å to 370 Å, from 280 Å to 330 Å, from 320 Å to 800 Å, from 310 Å to 360 Å, from 130 Å to 430 Å, from 320 Å to 800 Å, or from 350 Å to 400 Å.

With reference to FIGS. 3 and 4B, the metal oxynitride film 354 of protective coating 350 creates a stronger bond between the metal nitride film 356, and the metal oxide of the second film 326 of the uppermost dielectric layer 322 of the functional layer 320. Examples consistent with this disclosure include a silicon nitride film 356 disposed over and in contact with at least part of a silicon oxynitride film 354, which is disposed over and in contact with at least part of a zinc stannate uppermost dielectric layer 322.

It is to be understood that, in examples consistent with this disclosure, the silicon in the metal nitride film 356 and/or in the metal oxynitride film 354 may be replaced, at least in part, with oxides, oxynitrides, and nitrides, respectively, of other metals. These other metals may be the same or different between the films 354, 356. The metal may be titanium, hafnium, zirconium, niobium, zinc, bismuth, lead, indium, tin, aluminum, silicon and mixtures thereof.

With reference to FIGS. 4A and 4B, the coated article according to any aspect or embodiment of the coated articles described herein, may include a second protective film 360. The second protective film 360 is shown disposed over the metal nitride film 356, and may comprise, for example, a metal oxide or metal nitride layer. The second protective film 360 can be titania, alumina, silica, zirconia, tin oxide, a mixture thereof, or an alloy thereof. For example, the second protective film 360 may include a mixture of silica and alumina; a mixture of titania and alumina; or zirconia. An example of the second film 360 may include TiAlO. Non-limiting examples of the second protective film 360 may have a thickness range of such as 10 Å to 80 Å, such as 25 to 75 Å, such as 35 Å to 55 Å. It is to be understood that the second protective film 360 may be applied, e.g., as the top-most layer, to any other configuration of the uppermost dielectric layer, metal nitride, and metal oxynitride films consistent with the present disclosure. Alternatively, additional functional layers or protective layers may be applied over the second protective film 360. Similarly, it is to be understood that a coated article need not include a second protective film 360.

In non-limiting examples, the coated article may include an additional protective layer (not shown) positioned over the second protective film 360. This additional protective layer can be any of the materials used to form the protective coating 350, or the second protective film 360, or any material that may be used as a topcoat.

A primer, such as the optional primer 328 described above, may be positioned over and/or in direct contact with any of the metallic layers of the functional layer 320, or any metallic layer that is a continuous layer. In one non-limiting embodiment, the primer is not in direct contact with a discontinuous (subcritical) metal layer. In this embodiment, a primer is not applied immediately over or in direct contact with the discontinuous layer. The primer layers, however, may be positioned over and in direct contact with each of the continuous metallic layers. Additionally, the primer may be titanium, or a mixture or an alloy of titanium and aluminum, such as but not limited to titanium aluminide.

Figure 5:
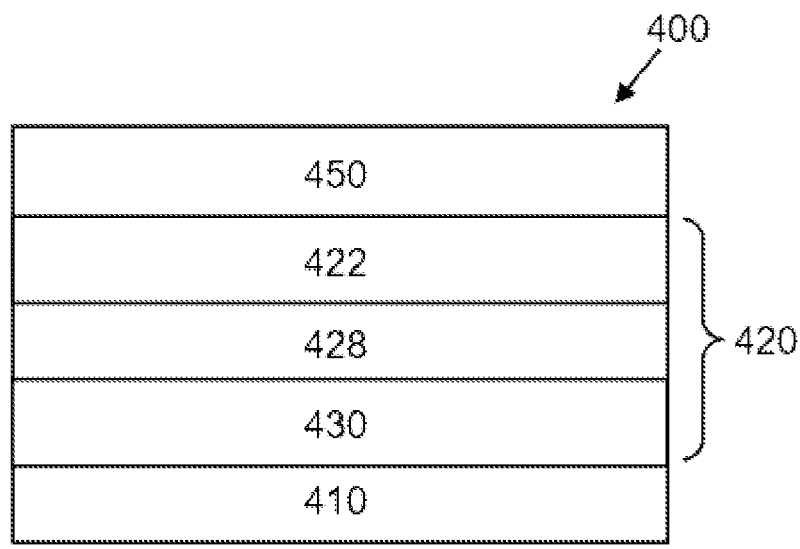
FIG. 5 is a sectional view (not to scale) of a coating according to an example of the invention.

With reference to FIG. 5, a transparent article 400 may include a substrate 410, a functional layer 420, and a protective coating 450. Although not shown, it is to be understood that some examples may include a second protective film 360 (FIG. 4B) according to this disclosure as well, although a second protective film 360 may not be included as well. In the example depicted in FIG. 5, the protective coating 450 may comprise a second protective film consistent with the second protective film 360 disclosed above, or any other configuration or topcoat known in the art that is consistent with this disclosure. The functional layer 420 may include a stack of metallic layers, dielectric layers, and primer layers consistent with the present disclosure.

With further reference to FIG. 5, functional layer 420 includes an uppermost dielectric layer 422. The uppermost dielectric layer 422 may be disposed at least partially over a primer layer 428, consistent with the present disclosure. In non-limiting examples, the uppermost dielectric layer 422 consists of a single layer, and may have an index of refraction of at least 1.5 and not more than 2.1, and more preferably of at least 1.9, and not more than 1.9, and still more preferably of at least 1.8, and not more than 1.85. In examples according to this disclosure, the uppermost dielectric layer 422 may consist of zinc stannate. The features of the uppermost dielectric layer 422 may be consistent with the features of the uppermost dielectric layer 322. In other examples, the uppermost dielectric layer 322, 422 does not comprise zinc 90 (90% zinc oxide, with 10% tin oxide).

It has been found through diligent testing that an uppermost dielectric layer 322 including zinc stannate improves durability of the stack, and reduces corrosion/glitter defects, under such conditions. Additionally, use of an uppermost dielectric layer 322 consisting of zinc stannate disposed on the upper most primer layer 328 of the functional layer 320 does not impact color control. Alternatively, zinc oxide or zinc 90 may be used at the uppermost dielectric layer. Alternatively, the uppermost dielectric layer can have two films, wherein the bottom film is a zinc oxide film, and the top film is a zinc stannate film.

Figure 6:
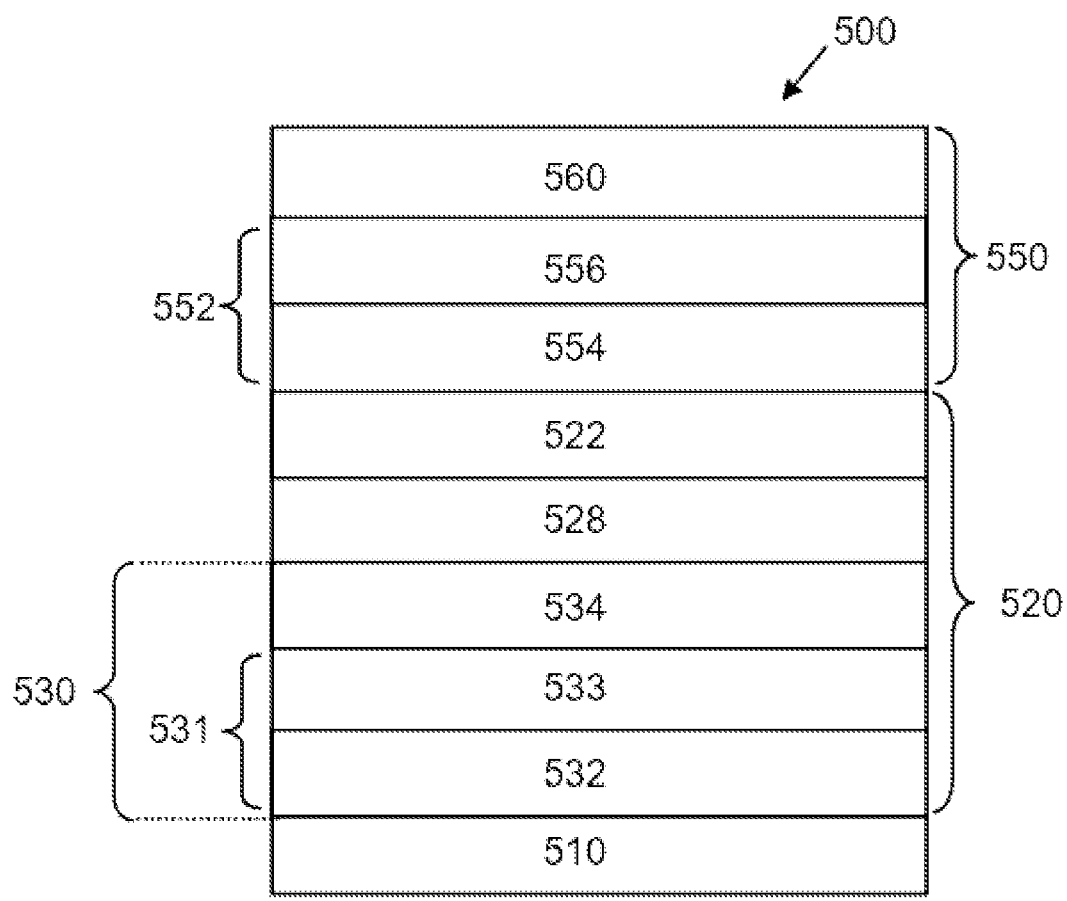
FIG. 6 is a sectional view (not to scale) of a coating according to an example of the invention.

In reference to FIG. 6, coated article 500 comprises: a substrate 510, according to any embodiment or aspect described herein; a functional layer 520 over the substrate 510; and a protective coating 550 over the functional layer 520. The functional layer 520 comprises a functional stack 530, comprising a metal oxide layer 531, according to any embodiment or aspect described herein, and a metallic layer 534, according to any embodiment or aspect described herein, over the metal oxide layer 531. An optional primer layer 528, according to any embodiment or aspect described herein, is deposited over the metallic layer 534. Functional layer 520 also comprises an uppermost dielectric layer 522, according to any aspect or embodiment described herein. Protective coat 550 is a protective coating according to any aspect or embodiment described herein. In one embodiment, the substrate 510 is glass; the metal oxide layer 531 is a dielectric layer, such as a layer of zinc oxide 532 with a second layer of zinc stannate 533 over the layer of zinc oxide; the metallic layer 534 comprises or consists of Ag; the primer layer 528 comprises or consists of Ti or TiAl; the dielectric layer 522 comprises or consists of zinc oxide and/or zinc stannate; and the protective coating 550 comprises a metal nitride layer comprising one or more layers of SiON, SiON, or $Si_3N_4$ over the metal oxide layer 522, and a second protective film 560 over the metal nitride layer 552. In one embodiment, e.g., in reference to FIG. 6, the metal nitride layer 552 of the protective coating 550 comprises a layer of a silicon oxynitride 554 over, and in contact with, the metal oxide layer 522, and a layer of a silicon nitride 556 over, and in contact with, the silicon oxynitride layer 554.

Tables 1-6 provides examples of useful coated articles according to the present disclosure, including thicknesses, and preferred thicknesses of the various layers.

TABLE 1

SiN over zinc stannate

| Material | Thickness range (Å) | Preferred Thickness range (Å) |
|---|---|---|
| Substrate | | |
| $Zn_2SnO_4$ | 250-400 | 270-330 |
| ZnO | 70-100 | 70-90 |
| Ag | 50-200 | 60-80 |
| TiAl or Ti | 10-30 | 10-30 |
| $Zn_2SnO_4$ | 20-100 | 30-60 |
| SiN | 250-400 | 280-330 |
| TiAlO | 250-400 | 270-330 |

TABLE 2

SiN over dielectric layer with zinc stannate layer
over zinc oxide layer

| Material | Thickness range (Å) | Preferred Thickness range (Å) |
|---|---|---|
| Substrate | | |
| Zn₂SnO₄ | 250-400 | 270-330 |
| ZnO | 70-100 | 70-90 |
| Ag | 50-200 | 60-80 |
| TiAl or Ti | 10-30 | 10-30 |
| ZnO | 20-100 | 30-60 |
| Zn₂SnO₄ | 20-100 | 30-60 |
| SiN | 100-400 | 280-330 |
| TiAlO | 250-400 | 270-330 |

TABLE 3

SiN over SiON over dielectric layer

| Material | Thickness range (Å) | Preferred Thickness range (Å) |
|---|---|---|
| Substrate | | |
| Zn₂SnO₄ | 250-400 | 270-330 |
| ZnO (90%) | 70-100 | 70-90 |
| Ag | 50-200 | 60-80 |
| TiAl or Ti | 10-30 | 10-30 |
| Zn₂SnO₄ | 20-100 | 30-60 |
| SiON | 70-400 | 110-130 |
| SiN | 150-400 | 200-250 |

TABLE 4

SiN over SiON over dielectric layer with TiAlO
protective layer

| Material | Thickness range (Å) | Preferred Thickness range (Å) |
|---|---|---|
| Substrate | | |
| Zn₂SnO₄ | 250-400 | 270-330 |
| ZnO | 70-100 | 70-90 |
| Ag | 50-200 | 60-80 |
| TiAl or Ti | 10-30 | 10-30 |
| Zn₂SnO₄ | 20-100 | 30-60 |
| SiON | 70-400 | 110-130 |
| SiN | 200-400 | 200-250 |
| TiAlO | 100-400 | 270-330 |

TABLE 5

SiON over dielectric film with TiAlO protective layer

| Material | Thickness range (Å) | Preferred Thickness range (Å) |
|---|---|---|
| Substrate | | |
| Zn₂SnO₄ | 250-400 | 270-330 |
| ZnO | 70-100 | 70-90 |
| Ag | 50-200 | 60-80 |
| TiAl or Ti | 10-30 | 10-30 |
| Zn₂SnO₄ | 20-100 | 30-60 |
| SiON | 70-400 | 280-330 |
| TiAlO | 100-400 | 270-330 |

TABLE 6

SiON gradient film over dielectric film with TiAlO
protective layer

| Material | Thickness range (Å) | Preferred Thickness range (Å) |
|---|---|---|
| Substrate | | |
| Zn₂SnO₄ | 250-400 | 270-330 |
| ZnO | 70-100 | 70-90 |
| Ag | 50-200 | 60-80 |
| TiAl or Ti | 10-30 | 10-30 |
| Zn₂SnO₄ | 20-100 | 30-60 |
| Gradient SiON (to SiN) | 100-400 (0%-100%)* | 280-330 (10% to 90%) |
| TiAlO | 100-400 | 270-330 |

*range of N % wt., excluding Si content, from Zn₂SnO₄ film to TiAlO film.

The following provides examples of coated articles according to the present disclosure. However, it is to be understood that the invention is not limited to these specific embodiments.

EXAMPLES

Examples 1-6 are examples of coated articles according to the invention. While the example shows embodiments wherein the functional layers comprises two dielectric layers and one metal layer, additional dielectric and/or metal layers may be present according to the invention. Furthermore, while the examples show embodiments wherein the top-most layer is either the metal oxynitride film, metal nitride film, or second protective film, it is understood that additional functional coatings and/or additional protective layers may be applied over the top-most layer shown in the examples. Furthermore, while the examples show the coating over a single piece of glass, it is understood that this coating may be applied to laminated glass, automotive glass, insulating glass units, etc.

Example 1

A substrate is coated with a functional layer. The substrate was glass. The functional layer includes a first dielectric layer disposed over the substrate, a metallic layer, a primer layer, and a second dielectric layer. The first dielectric layer comprises a zinc stannate film and a zinc oxide film. The metallic layer is disposed over the zinc oxide film of the first dielectric layer. The metallic layer is a continuous silver layer. A primer layer is disposed over the metallic layer, and a second dielectric layer is disposed over the primer layer. The second dielectric layer comprises zinc stannate. A protective layer is disposed over the second dielectric layer of the functional layer and comprises SiN and a second protective layer disposed over the SiN layer, comprising TiAlO. All thicknesses are approximate.

| Material | Example 1 Thickness range (Å) |
|---|---|
| Substrate | |
| Zn₂SnO₄ | 250-400 |
| ZnO | 70-100 |
| Ag | 60-80 |

-continued

| Material | Example 1 Thickness range (Å) |
|---|---|
| TiAl or Ti | 10-30 |
| Zn₂SnO₄ | 30-60 |
| SiN | 280-330 |
| TiAlO | 300 |

Example 2

A glass substrate is coated with a functional layer. The functional layer includes a first dielectric layer, a metallic layer, a primer layer, and a second dielectric layer. The first dielectric layer is disposed over the substrate, and comprises a zinc stannate film and a zinc oxide film positioned over the zinc stannate film. The metallic layer is disposed over the first dielectric layer. The metallic layer is a continuous silver layer. The primer layer is disposed over the metallic layer. A second dielectric layer is disposed over the primer layer. The second dielectric layer of this exemplary coated article comprises a first, zinc oxide film, and a second, zinc stannate film that is disposed over the first layer. A protective coating is disposed over the functional layer, and is in contact with the zinc stannate film of the second dielectric layer. The first protective layer comprises SiN. A second protective layer is disposed over the first protective layer, and comprises TiAlO. All thicknesses are approximate.

| Material | Example 2 Thickness range (Å) |
|---|---|
| Glass | |
| Zn₂SnO₄ | 250-400 |
| ZnO | 70-100 |
| Ag | 60-80 |
| TiAl or Ti | 10-30 |
| ZnO | 70-100 |
| Zn₂SnO₄ | 30-60 |
| SiN | 100-400 |
| TiAlO | 300 |

Example 3

A substrate is coated with a functional layer. The substrate may be of any suitable material, such as glass. The functional layer includes a first dielectric layer disposed over the substrate, a metallic layer, a primer layer, and a second dielectric layer. The first dielectric layer comprises a zinc stannate film and a zinc oxide film. The metallic layer is disposed over the zinc oxide film of the first dielectric layer. The metallic layer is a continuous silver layer. A primer layer is disposed over the metallic layer, and a second dielectric layer is disposed over the primer layer. The second dielectric layer consists of zinc stannate. A protective coating is disposed over the second dielectric layer of the functional layer and comprises a SiN layer, and an SiON layer disposed between the SiN layer and the dielectric layer. All thicknesses are approximate.

| Material | Example 3 Thickness range (Å) |
|---|---|
| Substrate | |
| Zn₂SnO₄ | 250-400 |
| ZnO | 70-100 |
| Ag | 60-80 |
| TiAl or Ti | 10-30 |
| Zn₂SnO₄ | 30-60 |
| SiON | 70-400 |
| SiN | 250-400 |

Example 4

A glass substrate is coated with a functional layer. The functional layer includes a first dielectric layer, a metallic layer, a primer layer, and a second dielectric layer that is an uppermost layer of the functional layer. The first dielectric layer is disposed over the substrate, and comprises a zinc stannate film and a zinc oxide film positioned over the zinc stannate film. The metallic layer is disposed over the first dielectric layer. The metallic layer is a continuous silver layer. The primer layer is disposed over the metallic layer. A second dielectric layer is disposed over the primer layer. The second dielectric layer of this exemplary coated article consists of a zinc stannate film. A protective coating is disposed over the functional layer, and is in contact with the zinc stannate second dielectric layer. The protective coating is disposed over the second dielectric layer of the functional layer and comprises a SiN layer, and an SiON layer disposed between the SiN layer and the dielectric layer. All thicknesses are approximate. A second protective layer is disposed over the SiN layer, and comprises TiAlO. All thicknesses are approximate.

| Material | Example 4 Thickness range (Å) |
|---|---|
| Glass | |
| Zn₂SnO₄ | 250-400 |
| ZnO | 70-100 |
| Ag | 60-80 |
| TiAl or Ti | 10-30 |
| Zn₂SnO₄ | 30-60 |
| SiON | 120 |
| SiN | 200-250 |
| TiAlO | 300 |

Example 5

A glass substrate is coated with a functional layer. The functional layer includes a first dielectric layer, a metallic layer, a primer layer, and a second dielectric layer. The first dielectric layer is disposed over the substrate, and comprises a zinc stannate film and a zinc oxide film positioned over the zinc stannate film. The metallic layer is disposed over the first dielectric layer. The metallic layer is a continuous silver layer. The primer layer is disposed over the metallic layer. A second dielectric layer is disposed over the primer layer. The second dielectric layer of this exemplary coated article comprises a zinc stannate film. A protective coating is disposed over the functional layer, and is in contact with the zinc stannate film of the second dielectric layer. The first protective layer comprises SiON. A second protective layer is disposed over the first protective layer, and comprises TiAlO. All thicknesses are approximate.

| Material | Example 5<br>Thickness range (Å) |
|---|---|
| Glass | |
| $Zn_2SnO_4$ | 250-400 |
| ZnO | 70-100 |
| Ag | 60-80 |
| TiAl or Ti | 10-30 |
| $Zn_2SnO_4$ | 30-60 |
| SiON | 280-330 |
| TiAlO | 300 |

Example 6

A glass substrate is coated with a functional layer. The functional layer includes a first dielectric layer, a metallic layer, a primer layer, and a second dielectric layer. The first dielectric layer is disposed over the substrate, and comprises a zinc stannate film and a zinc oxide film positioned over the zinc stannate film. The metallic layer is disposed over the first dielectric layer. The metallic layer is a continuous silver layer. The primer layer is disposed over the metallic layer. A second dielectric layer is disposed over the primer layer. The second dielectric layer of this exemplary coated article comprises a zinc stannate film. A protective coating is disposed over the functional layer, and is in contact with the zinc stannate film of the second dielectric layer. The first protective layer comprises SiON in a gradient film, with N content increasing, and O content decreasing in a direction from the zinc stannate film to the second protective layer, which is disposed over the first protective layer, and comprises TiAlO. All thicknesses are approximate.

| Material | Example 6<br>Thickness range (Å) |
|---|---|
| Glass | |
| $Zn_2SnO_4$ | 250-400 |
| ZnO | 70-100 |
| Ag | 60-80 |
| TiAl or Ti | 10-30 |
| $Zn_2SnO_4$ | 30-60 |
| SiON gradient | 280-330 |
| TiAlO | 300 |

The following numbered clauses are illustrative of various aspects of the invention:

Clause 1. A coated article comprising a substrate, a first functional layer over at least a portion of the substrate, and a protective coating over at least a portion of the functional layer, wherein an uppermost layer of the functional layer is a metal oxide film, and wherein the protective coating comprises one or more layers of a metal nitride, a metal oxynitride, or a combination thereof.

Clause 2. The coated article of clause 1, wherein the metal nitride, the metal oxynitride, or the combination thereof is at least one of silicon nitride, silicon oxynitride, or a combination thereof.

Clause 3. The coated article of clause 1, wherein the protective coating comprises a metal oxynitride film over and in contact with at least part of the metal oxide film of the uppermost layer of the first functional layer; and a metal nitride film over and in contact with at least a part of the metal oxynitride film.

Clause 4. The coated article of any one of clauses 1-3, wherein the protective coating comprises a silicon nitride film.

Clause 5. The coated article of any one of clauses 1-3, wherein the protective coating comprises a silicon oxynitride film.

Clause 6. The coated article of clause 3, wherein the metal oxynitride film is a gradient layer in which the portion of the metal oxynitride film closest to the uppermost layer of the first functional layer comprises a greater amount of oxygen than the portion of the metal oxynitride film closest to the metal nitride film.

Clause 7. The coated article of clause 1, wherein the protective coating comprises a metal oxynitride film over and in contact with at least portion of the metal oxide film of the uppermost layer of the first functional layer, wherein the metal oxynitride film is a gradient layer in which the amount of oxygen in the metal oxynitride film decreases with increased distance from the uppermost layer of the first functional layer or in which a portion of the metal oxynitride film closest to the uppermost layer of the first functional layer comprises a greater amount of oxygen than a portion of the metal oxynitride film farthest from the uppermost layer of the first functional layer.

Clause 8. The coated article of clause 7, wherein the metal oxynitride of the gradient layer is silicon oxynitride.

Clause 9. The coated article of any one of clauses 1-8, wherein the metal oxide film of the uppermost dielectric layer of the first functional layer comprises a zinc stannate or zinc oxide and the metal oxide film is immediately below and in contact with the protective coating.

Clause 10. The coated article of any one of clauses 1-9, wherein the first functional layer comprises a dielectric layer over at least a portion of the substrate, a metallic layer over at least a portion of the dielectric layer, and the uppermost layer over at least a portion of the metallic layer.

Clause 11. The coated article of clause 10, wherein the first functional layer further comprises a primer layer over the metallic layer and under at least a portion of the uppermost layer.

Clause 12. The coated article of clause 10 or 11, wherein the dielectric layer comprises one or more layers comprising zinc oxide and/or zinc stannate, the metallic layer comprises Ag, Cu, Au and/or Pd, and/or the uppermost layer comprises zinc oxide and/or zinc stannate.

Clause 13. The coated article of clause 12, wherein the uppermost layer of the functional layer does not comprise zinc oxide.

Clause 14. The coated article of any one of clauses 1-13, further comprising a second functional layer beneath at least a portion of the first functional layer and over at least a portion of the substrate.

Clause 15. The coated article of clause 14, wherein the second functional layer comprises a second dielectric layer, a second metallic layer over the second dielectric layer, and, optionally, a second primer layer over the metallic layer.

Clause 16. The coated article of any one of clauses 1-15, further comprising a second protective film disposed at least partially over the one or more layers of a metal nitride, a metal oxynitride, or a combination thereof, and wherein the second protective film comprises at least one of titania, alumina, silica, zirconia, a mixture of any two or more of the preceding, or an alloy of any one or more of the preceding.

Clause 17. The coated article of clause 16, wherein the second protective film comprises $TiO_2$ and/or TiAlO.

Clause 18. The coated article of any one of clauses 1-17, wherein the functional layer comprises a metallic layer and a primer layer over at least a portion of the metallic layer.

Clause 19. The coated article of clause 18, wherein the primer layer comprises titanium, or titanium and aluminum, and wherein at least a portion of the titanium, or titanium and aluminum are optionally oxidized after the titanium or titanium and aluminum are deposited over the metallic layer.

Clause 20. The coated article of clause 18, wherein the metallic layer comprises silver, gold, palladium, copper, or a mixture of any of the preceding.

Clause 21. The coated article of any one of clauses 18-20, wherein the metallic layer is a continuous metallic film.

Clause 22. The coated article of any one of clauses 18-21, wherein the metallic layer comprises silver, copper, or a mixture thereof.

Clause 23. The coated article of clause 1, comprising: a glass substrate; a first layer of zinc stannate over at least a portion of the glass substrate; a layer of zinc oxide over at least a portion of the layer of zinc stannate; a layer of silver over at least a portion of the layer of zinc oxide; a primer layer comprising Ti, TiAl and/or oxides thereof over at least a portion of the layer of silver; a second layer of zinc stannate or zinc oxide over at least a portion of the primer layer; a metal oxynitride layer comprising silicon oxynitride directly over at least a portion of the second layer of zinc stannate; a metal nitride layer comprising silicon directly over at least a portion of the metal oxynitride layer; and a second protective layer comprising Ti, TiAl, and/or oxides of either of the preceding over at least a portion of the metal nitride layer.

Clause 24. The coated article of clause 1, comprising: a glass substrate; a first layer of zinc stannate directly over at least a portion of the glass substrate; a layer of zinc oxide directly over at least a portion of the layer of zinc stannate; a layer of silver directly over at least a portion of the layer of zinc oxide; a primer layer comprising Ti, TiAl, and/or oxides of either of the preceding directly over at least a portion of the layer of silver; a second layer of zinc stannate directly over at least a portion of the primer layer; a metal oxynitride layer comprising silicon directly over at least a portion of the second layer of zinc stannate; a metal nitride layer comprising silicon directly over at least a portion of the metal oxynitride layer; and a second protective layer comprising TiAlO directly over at least a portion of the metal nitride layer.

Clause 25. The coated article of clause 1, comprising: a glass substrate; a first layer of zinc stannate over at least a portion of the glass substrate and having a thickness ranging from 250 Å to 400 Å; a layer of zinc oxide over at least a portion of the layer of zinc stannate and having a thickness ranging from 70 Å to 90 Å; a layer of silver over at least a portion of the layer of zinc oxide and having a thickness ranging from 70 Å to 90 Å; a primer layer comprising Ti over at least a portion of the layer of silver and having a thickness ranging from 10 Å to 30 Å; a second layer of zinc stannate over at least a portion of the primer layer and having a thickness ranging from 30 Å to 100 Å; a metal oxynitride layer comprising SiON directly over at least a portion of the second layer of zinc stannate and having a thickness ranging from 70 Å to 400 Å; a metal nitride layer comprising SiN directly over at least a portion of the metal oxynitride layer and having a thickness ranging from 100 Å to 400 Å; and a second protective layer comprising TiAlO over the metal nitride layer and having a thickness ranging from 100 Å to 400 Å.

Clause 26. The coated article of any one of clauses 1-25 mounted in a body of a vehicle.

Clause 27. The coated article of clause 26, mounted in an automobile as a sunroof.

Clause 28. The coated article of any one of clauses 1-25, mounted in an insulating glass unit.

Clause 29. A coated article comprising a substrate, a functional layer, having an uppermost layer, over at least a portion of the substrate, and a protective coating over at least a portion of the functional layer, wherein the uppermost layer of the functional layer is a dielectric layer having an index of refraction of at least 1.5, and not more than 2.1.

Clause 30. The coated article of clause 29, wherein the uppermost layer of the functional layer consists of zinc stannate.

Clause 31. The coated article of clause 29, wherein the uppermost layer of the functional layer does not include zinc oxide.

Clause 32. A coated article comprising a substrate, a functional layer over at least a portion of the substrate, and a protective coating over at least a portion of the functional layer, wherein the functional layer comprises at least one metallic layer and a primer layer disposed at least partially over and in contact with at least part of the at least one metallic layer, and wherein an uppermost layer of the functional layer is disposed over and in contact with at least part of the primer layer, and the uppermost layer of the functional layer does not include zinc oxide.

Clause 33. An insulating glass unit comprising a first ply having a number 1 surface and a number 2 surface, a second ply having a number 3 surface and a number 4 surface, and a coating comprising the functional layer and the protective coating as described in any of the clauses 1-31, wherein the coating is positioned over at least a portion of the number 2 surface or the number 3 surface.

Clause 34. The insulating glass unit according to clause 33 wherein the coating is positioned over the number 2 surface.

Clause 35. The insulating glass unit according to clause 33 or 34 further comprising a space between the number 2 surface of the first ply and the number 3 surface of the second ply, wherein the space is filled with a gas.

Clause 36. The insulating glass unit according to clause 35 wherein the gas is argon.

Clause 37. An automotive glass article comprising a first ply having a number 1 surface and a number 2 surface, and a coating comprising the functional layer and the protective coating as described in any of the clauses 1-31, wherein the coating is positioned over at least a portion of the number 1 surface or number 2 surface.

Clause 38. The automotive glass article according to clause 34 wherein the coating is positioned over the number 2 surface.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:
1. A coated article comprising:
a substrate;
a first functional layer, the first function layer comprising:
   a metallic layer over at least a portion of the substrate, wherein the metallic layer comprises a silver layer over at least a portion of the substrate; and
   a primer layer directly over at least a portion of the silver metallic layer, wherein the primer layer comprises titanium, alloys of titanium and aluminum, or combinations thereof;
a metal oxide layer directly over at least a portion of the primer layer of the first functional layer, wherein the metal oxide layer comprises zinc stannate;
a metal oxynitride gradient layer directly over at least a portion of the metal oxide layer, wherein the metal oxynitride gradient layer comprises silicon and has a thickness ranging from 280 Å to 330 Å; and
a protective layer directly over at least a portion of the metal oxynitride layer, wherein the protective layer comprises Ti, TiAl, TiO$_2$, TiAlO, or a combination thereof.

2. The coated article of claim 1, wherein the first functional layer further comprises a zinc stannate layer in direct contact with the substrate.

3. The coated article of claim 1, wherein the first functional layer further comprises a dielectric layer directly over at least a portion the substrate, and wherein the silver layer is directly over at least a portion of the dielectric layer.

4. The coated article of claim 3, wherein the dielectric layer comprises one or more layers comprising zinc oxide or zinc stannate.

5. The coated article of claim 1, wherein at least a portion of the primer layer is oxidized after the primer layer is deposited over the silver layer.

6. The coated article of claim 1, further comprising a second functional layer beneath at least a portion of the first functional layer and over at least a portion of the substrate.

7. The coated article of claim 1, wherein the metallic layer has a thickness ranging from 50 Å to 200 Å, the a primer layer has a thickness ranging from 10 Å to 30 Å, the metal oxide layer has a thickness ranging from 20 Å to 100 Å, and the protective layer has a thickness ranging from 100 Å to 400 Å.

8. The coated article of claim 1, wherein the metallic layer has a thickness ranging from 60 Å to 80 Å, the a primer layer has a thickness ranging from 10 Å to 30 Å, the metal oxide layer has a thickness ranging from 30 Å to 60 Å, and the protective layer has a thickness ranging from 270 Å to 330 Å.

9. A coated article comprising:
a glass substrate;
a zinc stannate layer directly over at least a portion of the glass substrate;
a zinc oxide layer directly over at least a portion of the zinc stannate layer;
a silver layer directly over at least a portion of the zinc oxide layer;
a primer layer directly over at least a portion of the silver layer, wherein the primer layer comprises titanium, alloys of titanium and aluminum, or combinations thereof;
a metal oxide layer directly over at least a portion of the primer layer, wherein the metal oxide layer comprises at least one layer of zinc oxide or at least one layer of zinc stannate;
a metal nitride layer directly over at least a portion of the metal oxide layer, wherein the metal nitride layer comprises silicon and has a thickness ranging from 280 Å to 330 Å; and
a protective layer directly over at least a portion of the metal nitride layer, wherein the protective layer comprises Ti, TiAl, TiO$_2$, TiAlO, or a combination thereof.

10. The coated article of claim 9, wherein the metal oxide layer comprises at least two sub-layers, the two sub-layers being formed from one sub-layer each of zinc oxide and zinc stannate.

11. The coated article of claim 10, wherein the zinc stannate layer has a thickness ranging from 270 Å to 330 Å, the zinc oxide layer has a thickness ranging from 70 Å to 90 Å, the silver layer has a thickness ranging from 60 Å to 80 Å, the a primer layer has a thickness ranging from 10 Å to 30 Å, the sub-layer of zinc oxide has a thickness ranging from 30 Å to 60 Å, the sub-layer of zinc stannate has a thickness ranging from 30 Å to 60 Å, and the protective layer has a thickness ranging from 270 Å to 330 Å.

12. The coated article of claim 9, wherein the zinc stannate layer has a thickness ranging from 250 Å to 400 Å, the zinc oxide layer has a thickness ranging from 70 Å to 100 Å, the silver layer has a thickness ranging from 50 Å to 200 Å, the a primer layer has a thickness ranging from 10 Å to 30 Å, the metal oxide layer has a thickness ranging from 40 Å to 200 Å, and the protective layer has a thickness ranging from 250 Å to 400 Å.

13. The coated article of claim 9, wherein the zinc stannate layer has a thickness ranging from 270 Å to 330 Å, the zinc oxide layer has a thickness ranging from 70 Å to 90 Å, the silver layer has a thickness ranging from 60 Å to 80 Å, the a primer layer has a thickness ranging from 10 Å to 30 Å, the metal oxide layer has a thickness ranging from 60 Å to 120 Å, and the protective layer has a thickness ranging from 270 Å to 330 Å.

14. A coated article comprising:
a glass substrate;
a zinc stannate layer directly over at least a portion of the glass substrate, wherein the zinc stannate layer has a thickness ranging from 250 Å to 400 Å;
a zinc oxide layer directly over at least a portion of the zinc stannate layer, wherein the zinc oxide layer has a thickness ranging from 70 Å to 100 Å;
a silver layer directly over at least a portion of the of zinc oxide layer, wherein the silver layer has a thickness ranging from 50 Å to 200 Å;
a primer layer directly over at least a portion of the silver layer, wherein the primer layer has a thickness ranging from 10 Å to 30 Å, and wherein the primer layer comprises Ti, TiAl, or an oxide or suboxide of TiAl;
a metal oxide layer directly over at least a portion of the primer layer, wherein the metal oxide layer has a thickness ranging from 20 Å to 100 Å, and wherein the metal oxide layer comprises at least a layer of zinc stannate;
a metal oxynitride layer directly over at least a portion of the metal oxide layer, wherein the metal oxynitride layer has a thickness ranging from 280 Å to 330 Å, and wherein the metal oxynitride layer comprises silicon oxynitride; and
a protective layer directly over the metal oxynitride layer, wherein the protective layer has a thickness ranging from 100 Å to 800 Å, and wherein the protective layer comprises Ti, TiAl, TiO$_2$, TiAlO, SiN, or a combination thereof.

15. The coated article of claim 14, wherein the coated article is a first ply in an automotive glass article, wherein the first ply has a number 3 surface and where a functional coating is positioned on the number 3 surface, and wherein the automotive glass article further comprises a second ply over the number 3 surface of the first ply.

16. The coated article of claim 14, wherein the protective layer further comprises a silicon nitride layer directly over the metal oxynitride layer, wherein the silicon nitride layer has a thickness ranging from 150 Å to 400 Å, and a TiAlO layer directly over the silicon nitride layer, wherein the TiAlO layer has a thickness ranging from 100 Å to 400 Å.

17. The coated article of claim 14, wherein the protective layer further comprises a silicon nitride layer directly over the metal oxynitride layer, wherein the silicon nitride layer has a thickness ranging from 200 Å to 250 Å, and a TiAlO layer directly over the silicon nitride layer, wherein the TiAlO layer has a thickness ranging from 270 Å to 330 Å.

18. The coated article of claim 14, wherein the zinc stannate layer has a thickness ranging from 270 Å to 330 Å, the zinc oxide layer has a thickness ranging from 70 Å to 90 Å, the silver layer has a thickness ranging from 60 Å to 80 Å, the a primer layer has a thickness ranging from 10 Å to 30 Å, the metal oxide layer has a thickness ranging from 30 Å to 60 Å, and the protective layer has a thickness ranging from 200 Å to 580 Å.

19. The coated article of claim 18, wherein the protective layer further comprises a silicon nitride layer directly over the metal oxynitride layer, wherein the silicon nitride layer has a thickness ranging from 200 Å to 250 Å, and a TiAlO layer directly over the silicon nitride layer, wherein the TiAlO layer has a thickness ranging from 270 Å to 330 Å.

* * * * *